United States Patent [19]
Funawatari et al.

[11] Patent Number: 5,988,374
[45] Date of Patent: Nov. 23, 1999

[54] DISC CARTRIDGE CONTAINER CASE

[75] Inventors: Takatsugu Funawatari; Shiuchi Kikuchi, both of Miyagi, Japan

[73] Assignee: Sony Corporation, Japan

[21] Appl. No.: 09/246,809

[22] Filed: Feb. 9, 1999

[30] Foreign Application Priority Data

Feb. 9, 1998 [JP] Japan ................... 10-027666

[51] Int. Cl.[6] ............................................. B65D 85/57
[52] U.S. Cl. .................................. 206/308.1; 206/308.3; 206/232
[58] Field of Search ................................ 206/307, 308.3, 206/308.1, 1.5, 309–313; 220/4.21

[56] References Cited

U.S. PATENT DOCUMENTS

| | | | |
|---|---|---|---|
| 3,860,248 | 1/1975 | Hunt et al. ........................... | 206/308.3 |
| 4,316,539 | 2/1982 | Torrington .......................... | 206/308.3 |
| 4,476,978 | 10/1984 | Saito ...................................... | 206/312 |
| 4,627,531 | 12/1986 | Clemens ................................. | 206/309 |
| 5,385,235 | 1/1995 | Ikebe et al. ........................... | 206/308.1 |
| 5,450,952 | 9/1995 | Funawatari et al. . | |
| 5,531,324 | 7/1996 | Kosaki et al. ......................... | 206/449 |
| 5,881,871 | 3/1999 | Ikebe et al. ........................... | 206/308.1 |
| 5,915,549 | 6/1999 | Palmer et al. ......................... | 206/308.1 |

FOREIGN PATENT DOCUMENTS 5-042986  2/1993  Japan .
5-278772  10/1993  Japan .

*Primary Examiner*—Paul T. Sewell
*Assistant Examiner*—Nhan T. Lam
*Attorney, Agent, or Firm*—Rader, Fishman & Grauer; Ronald P. Kananen

[57] ABSTRACT

The present invention provides a disc cartridge container case enabling to assure protection of a disc cartridge and easily insert and remove the disc cartridge, as well as to constitute with various designs at reasonable cost. The disc cartridge container case includes: a frame body 15 constituted as a unitary block by a first and a second frame 12 and 13 opposing to each other and a connection frame 14 connecting the first and the second frames 12 and 13; and a first cover plate 16 and a second cover plate 17 inserted between the first and the second frames 12 and 13. The frame body 15 is formed from a synthetic resin having a shock resistance greater than that of the first and the second cover plates. The first and the second cover plates 12 and 13 are formed from a light-transmitting synthetic resin.

The first and the second cover plates 12 and 13 have at their both sides, insert margins 18 and 19 which are inserted into first and second insert grooves 21 and 22 formed on the first and the second frames 12 and 13, and an engagement protrusion 35 is engaged relatively with an engagement hole 36, thus mounted on the frame body 15.

15 Claims, 11 Drawing Sheets

DISC CARTRIDGE CONTAINER CASE

BACKGROUND OF THE INVENTION

1. Field of the Invention

The present invention relates to a disc cartridge container case for containing a disc cartridge containing a disc used as a recording medium of an information signal such as an optical disc and a magnetic disc.

2. Description of the Prior Art

A disc cartridge containing a disc used as a recording medium is contained in a disc cartridge containing apparatus during a storage period while not used on a disc recording and/or reproduction apparatus.

The disc cartridge containing a disc has an opening for exposing a part of a signal recording area of the disc outward for recording and/or reproduction. The disc cartridge has shutter for closing the opening so as to prevent deterioration of the disc due to foreign matters including dust intruding via the opening into the cartridge during a storage period.

If the shutter is unintentionally operated during a storage period of the disc cartridge so as to open the opening for recording and/or reproduction, it becomes impossible to prevent intrusion of foreign matters including dust.

To cope with this, as well as to prevent shock due to a falling object, the disc cartridge is normally contained in a container case.

Such a container case is disclosed in Japanese Patent Publication A-5-42986 1 filed by the applicant of the present invention. The container case disclosed in this publication is made from a synthetic resin sheet material folded into a bag shape, which cannot guarantee a sufficient mechanical strength. If a strong shock is applied due to a falling object to the case, a disc cartridge inside may be deteriorated.

The container made from a sheet material folded has a problem that the sheet material cannot be bent with a high accuracy and the disc cartridge contained may be fallen from the case.

In order to solve these problems, the applicant of the present invention has suggested a disc cartridge container case disclosed in Japanese Patent Publication A-5-278772 2 for a sufficient protection of the disc cartridge inside. The case disclosed in this publication has case main body having a rectangular bottom plate with three sides provided with a rise wall and a top plate facing the bottom plate so as to define an opening for mounting/removing the disc cartridge.

The container case disclosed in publication 2 has the case main body and the top plate that can be made from a material which can guarantee a sufficient mechanical strength, so as to protect the disc cartridge contained. The container case disclosed in 2 is made from an acrylonitrile butadiene styrene resin (ABS) or high-impact polystyrene (Hi-PS) having a high shock resistance. These resins are usually not transparent. Accordingly, if the entire case is made from these resins, it becomes impossible to see the inside through the case so as to identify the type of the disc cartridge contained inside.

In order to solve these problems, there has been suggested a case that guarantees a high shock resistance and has a top plate made from a transparent resin such polystyrene (PS) and acrylonitirile styrene (AS).

However, if only the top plate is made from a transparent material, it is impossible to see both sides of the disc cartridge contained.

There has been suggested a container case having a case body made from a transparent PS resin or AS resin so that both sides of the disc cartridge contained can be seen. However, if the entire case is made from a transparent PS resin or AS resin, it becomes impossible to obtain a sufficient shock resistance and the case is easily broken when subjected to a shock such as a falling object. That is, it becomes impossible to protect the disc cartridge contained.

In order to guarantee the shock resistance as well as enable to see both sides of the disc cartridge contained, there has been suggested a case having a case main body and a top plate made from a transparent PC (polycarbonate) or a transparent ABS resin having a high shock resistance. However, these resins are expensive and the material cost is significantly increased, which in turn significantly increases the production cost.

The aforementioned disc cartridge container cases intend to sufficiently protect a disc cartridge contained as well as enable to see both sides of the disc cartridge contained by using a limited range of the material used. This limit in the material also restricts the design of the container case.

SUMMARY OF THE INVENTION

It is therefore an object of the present invention to provide a disc cartridge container case capable of sufficiently protecting a disc cartridge contained, while allowing a flexibility of design and facilitating the operation with reasonable costs.

The disc cartridge container case according to the present invention includes: a frame body constituted into a unitary block by a first frame and a second frame opposing to each other and a connection frame connecting base ends of the first frame and the second frame; and a first cover plate and a second cover plate to be inserted between the first and the second frames. Accordingly, it is possible to select materials most appropriate respectively for the frame body, the first cover plate, and the second cover plate. Here, it is possible to form the frame body from a synthetic resin having an excellent shock resistance compared to that of the first and the second cover plates, and at least one of the first and second cover plates from a light-transmitting synthetic resin.

The first and the second cover plates are mounted on the frame body with insert margins provided at opposing two sides of the first and the second cover plates inserted into first and second insert grooves formed on opposing surfaces of the first and the second frames, so as to make a relative engagement of engagement mens provided between the insert margins and the first and second frames. This enables to easily assemble the container case.

The first and the second cover plates have at their base ends: an abutment piece to be brought into abutment with the connection frame when the first and the second cover plates are inserted between the first and the second frames; and engagement means consisting of an engagement protrusion and an engagement hole for relative engagement between the abutment piece and the connection piece. Accordingly, it is possible to firmly fix the first and the second cover plates to the frame body.

An engagement protrusion constituting the engagement means provided between the insert margins and the first and the second frames is provided on the insert margins; a first guide portion for guiding into the engagement hole is formed at the insert tip end of the first and the second cover plates; and a first removal preventing wall is formed at the base end opposing to the insert direction of the first and the second cover plates. This enables to easily insert the first and the second cover plates into the frame body as well as to prevent fall-off from the frame body.

Furthermore, the engagement protrusion provided on the insert margins is provided on a surface parallel to an outside surface of the first and the second cover plates; first and second engagement holes of the frame body are provided on an outside flat wall constituting the first and the second insert grooves; a second engagement guide portion is provided for guiding a relative engagement between the engagement protrusion with the engagement hole in a direction orthogonally intersecting the insert direction of the first and the second cover plates into the frame body; and a second removal preventing wall is formed at a side opposing to the side where the second engagement guide portion is formed. Accordingly, when the first and the second frames are deformed to apart from each other, the engagement protrusion is easily engaged relatively with the engagement hole, and it is possible to regulate only deformation in the direction to apart the first and the second frames from each other.

The connection frame of the frame body is formed with an urging force for urging the first and the second cover plates mounted on the frame body with relative engagement through the engagement means provided between the insert margins and the first and the second frames, into a direction opposite to the insert direction into the frame body. Accordingly, it is possible to mount the first and the second cover plates onto the frame body with an accurate positioning while absorbing an engagement error of the engagement means.

The insert margin has a stepped portion so as to have a thickness smaller than a thickness of the first and the second cover plates. Accordingly, it is possible to mount the first and the second cover plates onto the frame body without generating a large step between the first and second cover plates and the frame body.

Furthermore, the connection frame of the frame body has at its opposing ends, a stepped portion formed to have a thickness almost identical to that of the first and the second cover plates to be inserted between the first and the second frames. Accordingly, it is possible to insert the first and the second cover plates from the connection frame side.

Cartridge holding grooves are provided in the longitudinal direction of the first and the second frames for holding opposing two sides of a disc cartridge to be contained in the container case; and the cartridge holder is provided in the cartridge grooves. Accordingly, the disc cartridge can be contained without contact with the first and the second cover plates, and it is possible to obtain a space between the disc cartridge and the first and the second cover plates for inserting a printed matter.

A support means insert groove is formed at the outer sides of the first and the second frames for enabling engagement with support means provided in a storage apparatus. Accordingly, it is possible to regularly place a plurality of container cases in the storage apparatus having multiple steps.

Furthermore, the cartridge holder is formed by forming on the side wall of the first and the second frames a protruding portion in an opposing direction, so that an indentation formed at the opposite side of this protruding portion is used as an engagement portion of the engagement holder provided in a storage apparatus.

Accordingly, the disc cartridge container case can be stored in the storage apparatus without falling out of the storage apparatus.

Furthermore, a label attachment section is provided on the outer surface of the connection frame of the frame body. Accordingly, it is possible to indicate contents of the disc cartridge contained.

DETAILED DESCRIPTION OF PREFERRED EMBODIMENTS

Description will now be directed to a disc cartridge container case according to the present invention with reference to the attached drawings.

The container case according to the present invention is for containing a disc cartridge containing a disc as a recording medium of an information signal such as an optical disc and a magneto-optical disc.

Figure 1:
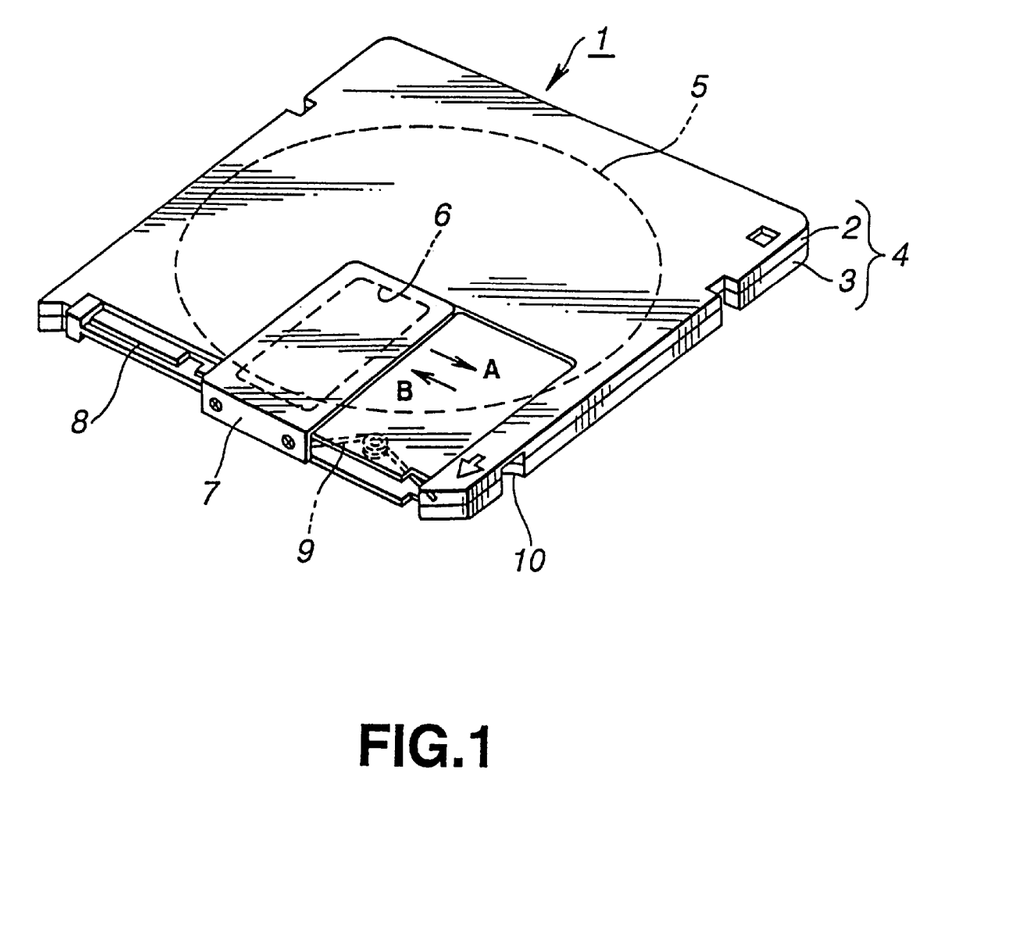
FIG. 1 is a perspective view showing a disc cartridge to e contained in a disc cartridge container case according to the present invention.

Referring to FIG. 1, a disc cartridge 1 to be contained in the container case includes a cartridge main body 4 consisting of an upper half 2 and a lower half 3 formed from a synthetic resin and connected to each other. The cartridge main body 4 has an upper place and a lower plane having a window 6 provided for exposing outward a signal recording area of the optical disc 5 for recording and/or reproduction.

The cartridge main body 4 has a shutter 7 having a U-shaped cross section which is fitted from the front of the cartridge main body 4 for closing and opening the window. This shutter 7 is attached to a slider 8 movably mounted on the from side of the cartridge main body 4 and can be moved in directions of A and B in FIG. 1 for opening and closing the window 6. The shutter 7 is urged in the direction of B in FIG. 1 by a twisted coil spring 9 provided in the cartridge main body so as to always close the window 6, but can be moved in the direction of A in FIG. 1 against the urging force of the twisted coil spring 9 to open the window 6. Accordingly, when the shutter 7 is subjected to a force to move the shutter 7 in the direction of A in FIG. 1 against the urging force of the twisted coil spring 9, the shutter 7 is moved to open the window 6.

A cartridge loading engagement indentation 10 used when mounting the disc cartridge 1 on a recording and/or reproduction apparatus is provided at both sides of the front of the cartridge main body 4 where the shutter 7 is attached. As shown in FIG. 1, this engagement indentation 10 is an opening in the side from the lower half which opening is closed by the upper half 2.

Figure 2:
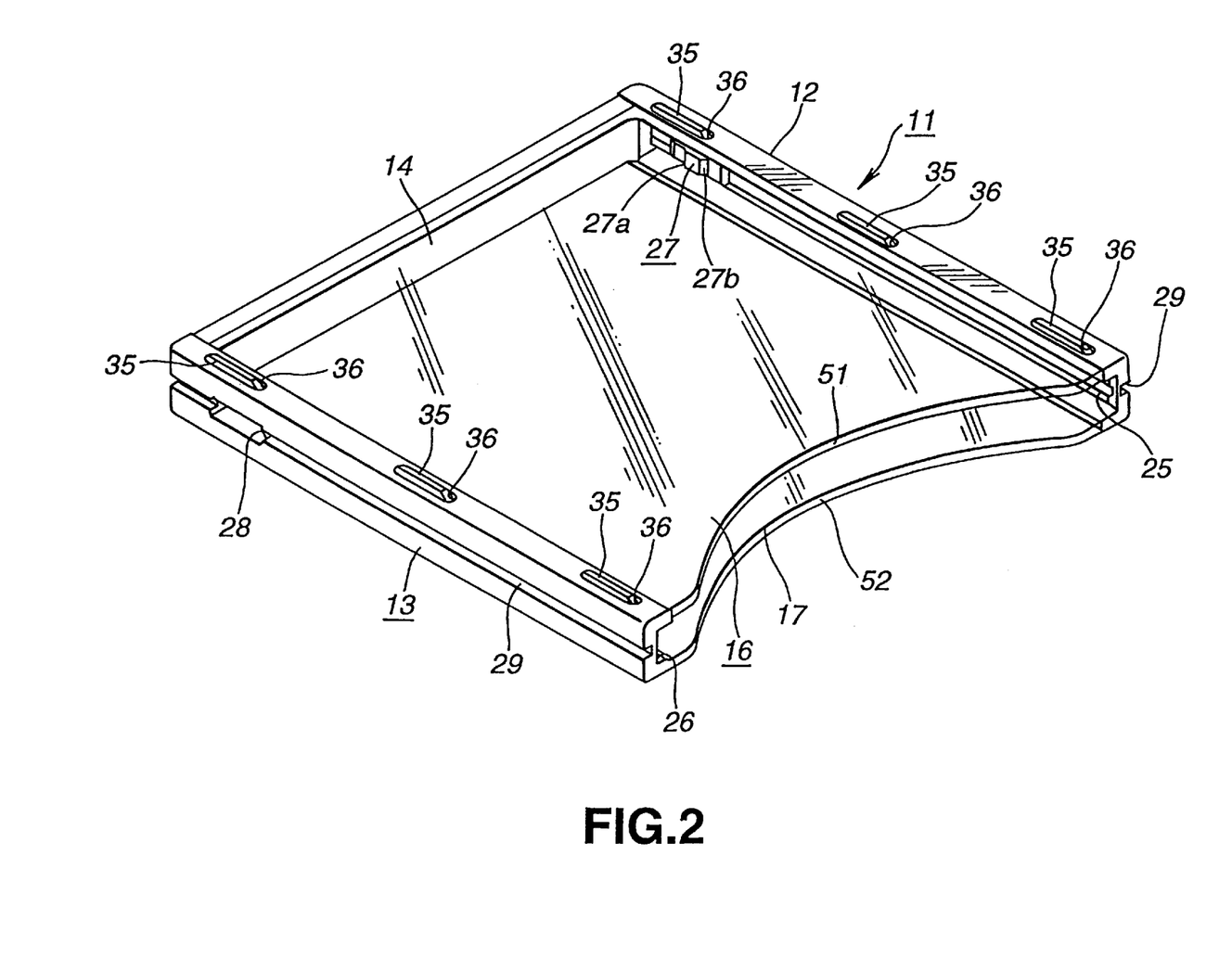
FIG. 2 is a perspective view showing the disc cartridge container case according to the present invention.
Figure 3:
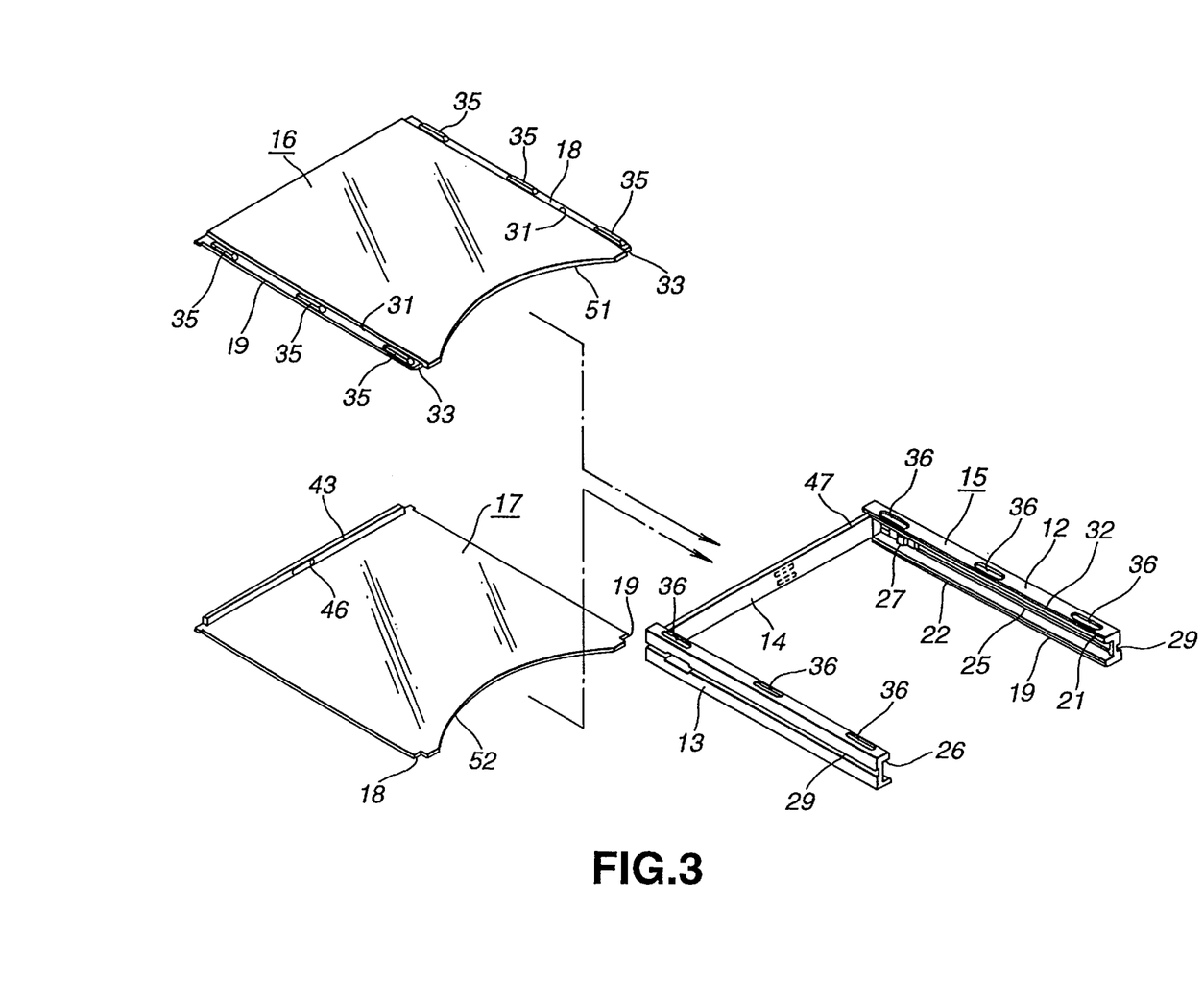
FIG. 3 is an exploded perspective view showing the disc cartridge container case according to the present invention.

As such, the container case 11 for containing the disc cartridge 1 according to the present invention, as shown in FIG. 2 and FIG. 3, includes a frame body 15 having a first frame 12 and a second frame 13 extending in parallel to each other, whose base portions are connected by a connection frame 14; and a first cover plate 16 and a second cover plate 17 which are respectively inserted between the first and the second frames 12 and 13 of the frame body 15, so as to be in parallel to each other.

Figure 4:
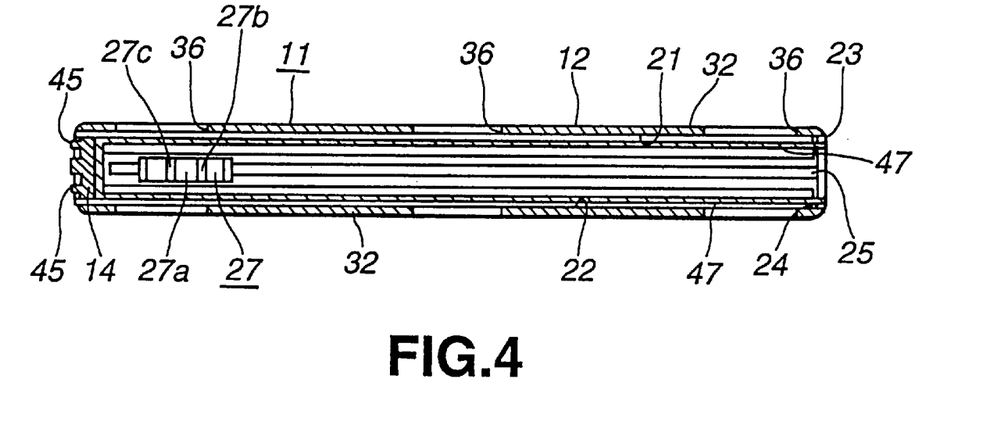
FIG. 4 is a vertical cross sectional view showing a frame body constituting the disc cartridge container case according to the present invention.
Figure 5:
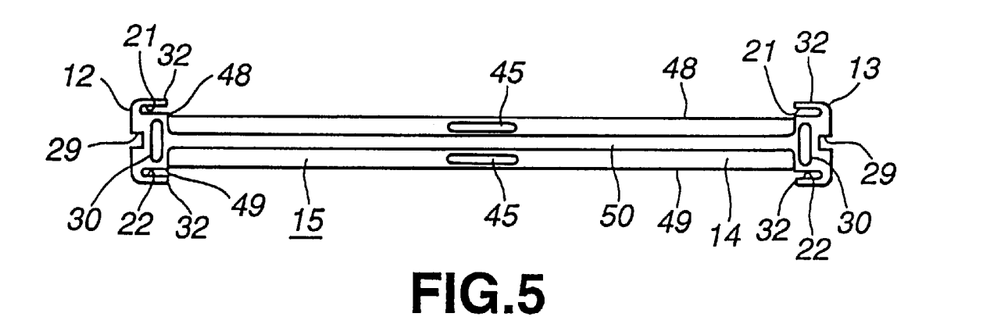
FIG. 5 is a rear view of the frame body.

As shown in FIG. 3 and FIG. 4, the first frame 12 and the second frame 13 constituting the frame body 15 have on their opposing inside surfaces a first insert groove 21 and a second insert groove 22, respectively, that receive insert margins 18 and 19 formed at the opposing sides of the first and the second cover plates 16 and 17. The first insert groove 21 and the second insert groove 22 are formed in parallel to each other almost over the entire length from their base portions, connected by the connection frame 14, to the tip ends. As shown in FIG. 4 and FIG. 5, these first and second insert grooves 21 and 22 are open at the base portions and closed at the tip ends. The opening end of the base portions serve as insert ends for the insert margins 18 and 19, whereas the closed tip ends serve as insert position regulators 23 and 24 for regulating the insert position of the insert margins 18 and 19.

Figure 6:
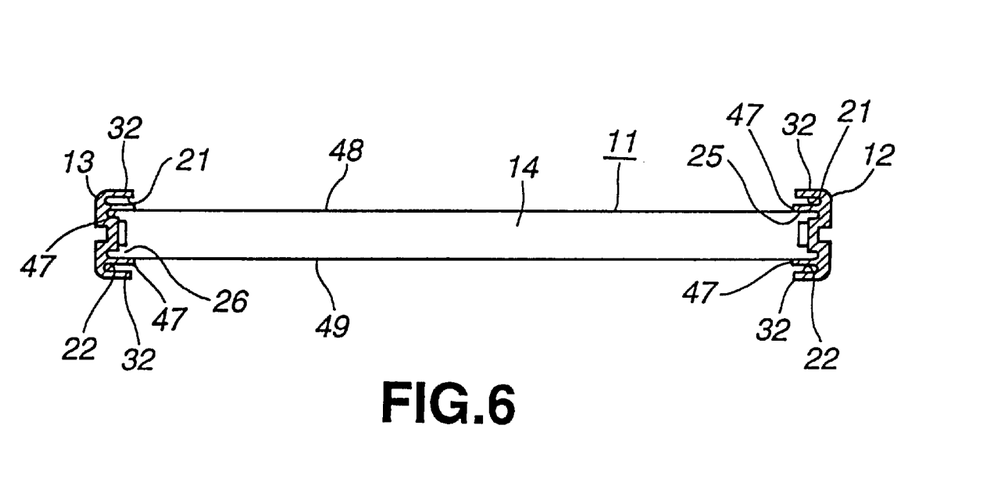
FIG. 6 is a vertical cross sectional view of the frame body.

Furthermore, as shown in FIG. 4 and FIG. 6, the disc cartridge 1 is contained in the disc container case 11 with its both sides held by cartridge holding grooves 25 and 26 formed on the opposing inside surfaces of the first and the second frames 12 and 13. The cartridge holding grooves 25 and 26 are located between the first and the second grooves 21 and 22 and extend almost over the entire length of the frames 12 and 13 from their tip ends to the base portions. As shown in FIG. 4, the cartridge holding grooves 25 and 26 are open at the tip ends of the frames 12 and 13 and closed at the base portions by the connection frame 14. The open ends at the tip ends serve as the insert ends of the disc cartridge 1 and the closed ends at the base portions closed by the connection frame 14 serve as the insert position regulators of the disc cartridge 1.

Figure 7:
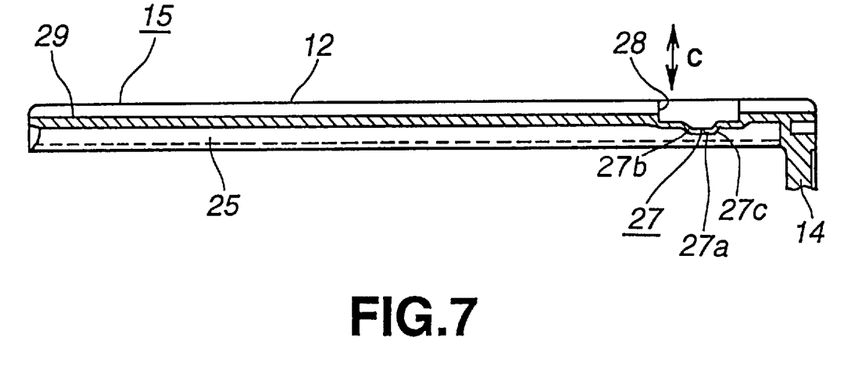
FIG. 7 is plan cross sectional view showing a cartridge holder provided on a frame constituting the frame body.

As shown in FIG. 3, FIG. 4, and FIG. 6, at the base portions of the first and the second frames 12 and 13, there are provided cartridge holders 27, 27 to be engaged with the engagement indentations 10, 10 provided at the opposing sides of the disc cartridge 1 so as to prevent removal of the disc cartridge 1 from the disc container case 11. As shown in FIG. 2, FIG. 6, and FIG. 7, the cartridge holders 27 are formed to protrude into the cartridge holding grooves 25 and 26.

Figure 8:
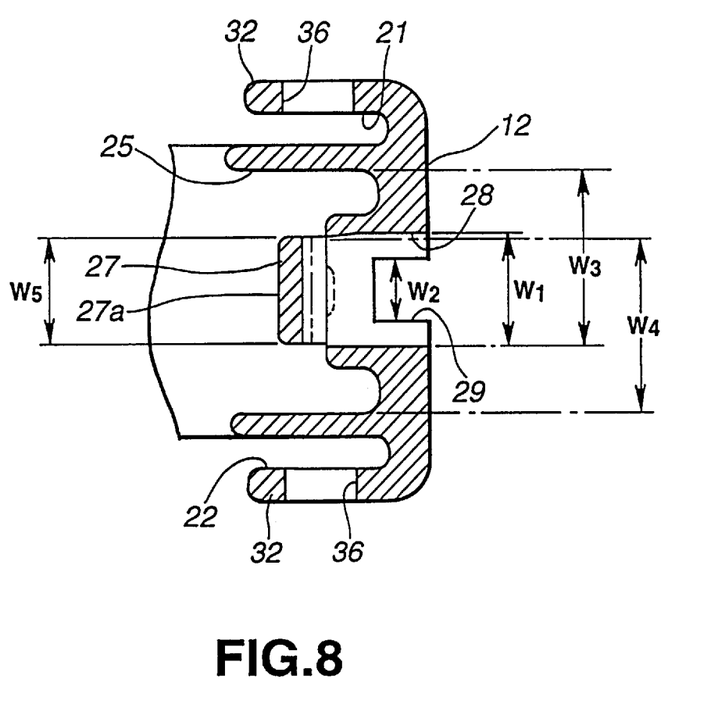
FIG. 8 is a vertical cross sectional view showing a portion having the cartridge holder of the frame.

As shown in FIG. 7 and FIG. 8, a through hole 28 is formed in the first and in the second frames 12 and 13, so that the cartridge holders 27 are formed as a unitary block with the first and the second frames 12 and 13 while connecting with the first and the second frames 12 and 13 only both sides of the disc cartridge 1 in the mounting/removal direction with respect to the cartridge holding grooves 25 and 26. At the center portion of the cartridge holder 27, there is provided an engagement protrusion 27a protruding into the cartridge holding grooves 25, 26. When the engagement indentation 10 of the disc cartridge 1 is engaged with or removed from the engagement protrusion 27a, the cartridge holder 27 can easily be displaced in a direction of arrow C in FIG. 7 which orthogonally intersects the mounting/removing direction of the disc cartridge 1 that appears in and disappears from the engagement indentation 10. Moreover, as shown in FIG. 7, the engagement protrusion 27a is provided at its both sides with engagement guide planes 27b and 27c slanting in the mounting/removing direction of the disc cartridge 1. These engagement guide planes 27b, 27c help the engagement protrusion 27a to be guided into or removed from the engagement indentation 10 of the disc cartridge 1.

Moreover, as shown in FIG. 4 and FIG. 8, the cartridge holder 27 is provided almost at a center in the width direction of the cartridge holding grooves 25, 26. Here, as shown in FIG. 8, the cartridge holder 27 is formed in such a manner that a distance (width) $W_3$ from the upper surface of the cartridge holding grooves 26, 26 to the lower surface of the cartridge holder 27 and a distance (width) $W_4$ from the lower surface of the cartridge holding grooves 26, 26 to the upper surface of the cartridge holder 27 are respective ly formed to be smaller than the width $W_5$ of the engagement indentation 10. Because of this configuration of the cartridge holder 27, even if the disc cartridge 1 is inserted into the container case 11 upside down, the disc cartridge 1 is assured to be engaged with the engagement indentation 10 formed over the side surface from the lower half 3 and closed at the side of the upper half.

Furthermore, as shown in FIG. 8, when the cartridge holder 27 is formed in the first and the second frames 12, 13 of the frame body 15, the width $W_5$ of the cartridge holder 27 is made smaller than the width $W_1$ of the through hole 28. This enables to provide an inclination on the side surface of the through hole 28 as well as in the metal mold for molding the cartridge holder 27, thus enabling to increase the strength of the metal mold.

Figure 9:
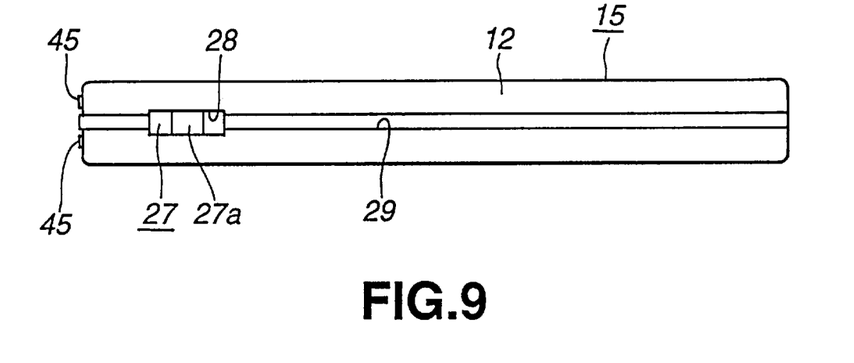
FIG. 9 is a side view of the frame body.

As shown in FIG. 2 and FIG. 9, on the outer side of the first and the second frames 12, 13, there is provided a support piece engagement groove 29 for engagement with an engagement piece provided in a case storage apparatus for storing a plurality of container cases 11 in a stacked way. The support piece engagement groove 29 is formed over the entire length of the first and the second frames 12, 13 and is open at the base portions and at the tip ends of the first and the second frames 12, 13. As the both ends are open, the container case can be inserted into the case storage apparatus in either direction.

Moreover, at the base portion surface of the first and the second frames 12, 13, i.e., on the rear surface of the frame body 15, there is provided an insert hole 30 that can be engaged with a support protrusion provided in the case storage apparatus.

On the other hand, as shown in FIG. 8, the through hole 28 provided for defining the cartridge holder 27 and the support piece engagement groove 29 are formed in such a manner that they are overlapped at the center of the width direction of the first and the second frames 12, 13. Here, the through hole 28 has a width $W_1$ greater than a width $W_2$ of the support piece engagement groove 29, so as to position the container case 11 to be contained in this storage apparatus with engagement with this case engagement holder, preventing removal from the storage apparatus.

Figure 10:
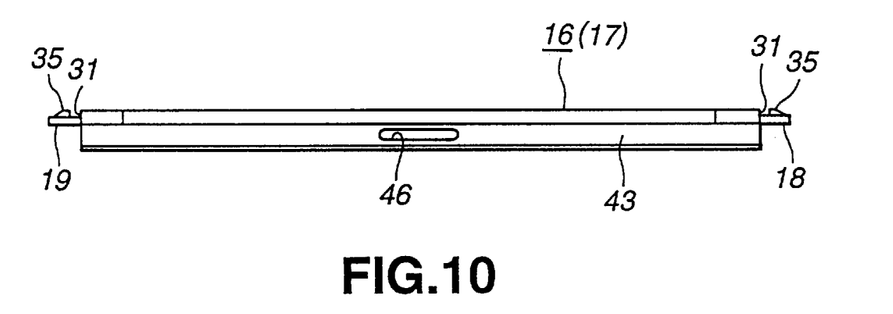
FIG. 10 is a rear view of a cover plate constituting the disc cartridge containing according to the present invention.
Figure 11:
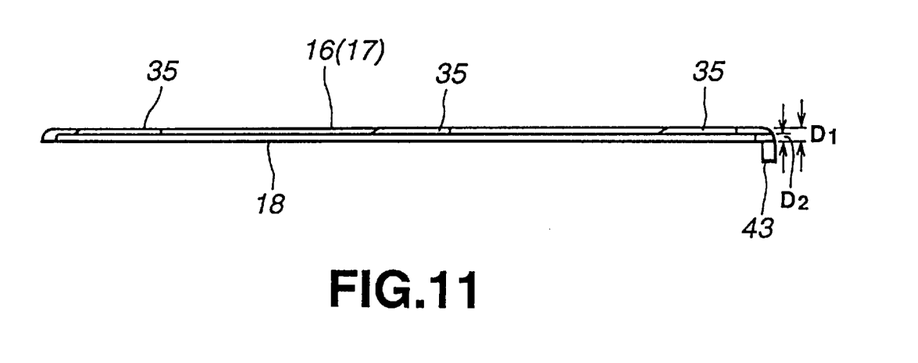
FIG. 11 is a side view of the cover plate.
Figure 12:
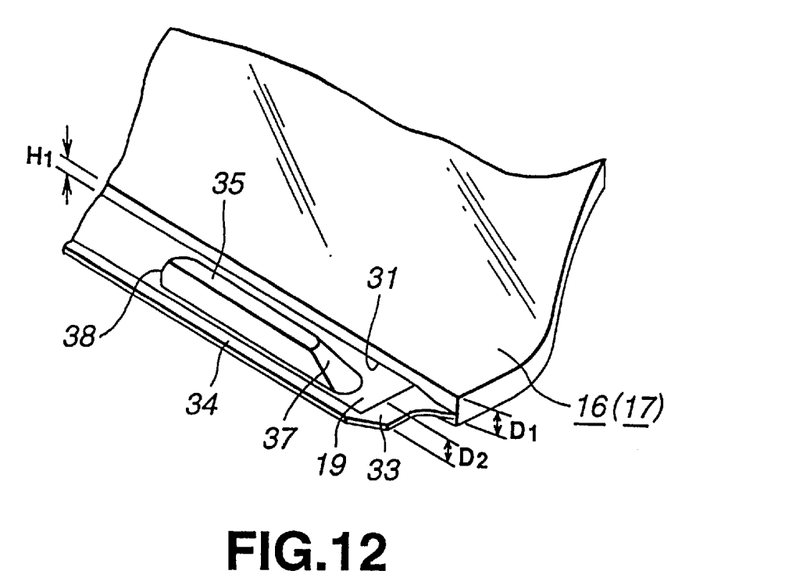
FIG. 12 is a perspective view showing an insert margin and an engagement protrusion provided on the cover plate.

As shown in FIG. 3 and FIG. 10, the first cover plate 16 and the second cover plate 17 are inserted into the frame body 15 having the aforementioned configuration/ The first cover plate 16 and the second cover plate 17 have insert margins 18 and 19 to be inserted and engaged with the first and the second insert grooves 21 and 22. As shown in FIG. 11 and FIG. 12, these insert margins 18 and 19 are formed with a thickness $D_2$ smaller than the thickness $D_1$ of the cover plates 16 and 17. This thickness difference forms a stepped portion 31. The stepped portion 31 provided to form the insert margins 18, 19 serves to absorb or adjust a stepped portion generated between a flat wall 32 of the first and the second frames 12, 13 constituting these insert grooves 21, 22 and the flat plane of the first and the second cover plates 16, 17.

As shown in FIG. 12, first and second insert guides 33, 34 are formed as slanting planes at the insert-into-frame body 15-direction end of the insert margins 18, 19 and at the side end parallel to the insertion direction, for facilitating insert of the insert margins 18, 19 into the first and the second insert grooves 21, 22.

A plurality of engagement protrusions 35 are formed outside of the stepped portion 31 on the first and the second cover plates 16, 17, so as to constitute an engagement mechanism to prevent removal of the first and the second cover plates 16, 17 from the frame body 15. These engagement protrusions 35 are relatively engaged with the through hole 36 provided in the flat wall 32 of the first and the second frames 12, 13 constituting the insert grooves 21, 22. As shown in FIG. 3 and FIG. 11, a plurality of engagement protrusions 35 are provided in the insert direction of the first and the second cover plates 16, 17 into the frame body 15. More specifically, as shown in FIG. 11, the engagement protrusions 35 are provided at the tip end in the insert direction of the first and the second cover plates 16, 17 into the frame body 15, in the middle, and at the base end.

It should be noted that as shown in FIG. 3, corresponding to the respective engagement protrusions 36, a plurality of engagement holes 36 are provided in the longitudinal direction of the first and the second frames 12, 13.

Figure 13:
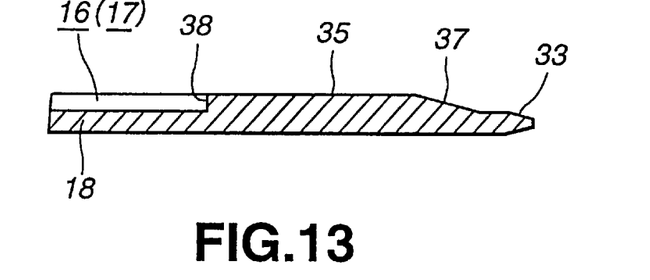
FIG. 13 is a vertical-longitudinal cross sectional view showing an engagement protrusion provided on the cover plate.

Each of these engagement protrusions 35 has a first engagement guide portion 37 at the insert-direction end into the frame body 15. As shown in FIG. 12 and FIG. 13, the first engagement guide portion 37 is formed as a slanting plane toward the base end. Moreover, as shown in FIG. 13, a first removal preventing wall 38 is formed extending from the plane of the insert margins 18 and 19 at the base end side of the engagement protrusion 35 no having the first engagement guide portion 37. When the engagement protrusion 35 is engaged with the engagement hole 36, the first removal preventing wall 38 is brought into a relative abutment with an inner cicumferential vertical surface of the engagement hole 36, thus preventing removal of the engagement protrusion 35 from the engagement hole 36.

Figure 14:
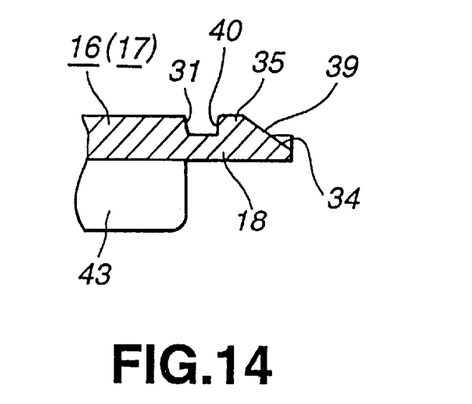
FIG. 14 is a vertical-width direction cross sectional view showing the engagement protrusion provided on the cover plate.

Moreover, as shown in FIG. 14, a second engagement guide portion 39 is formed on the side plane of the engagement protrusion 35, for guiding a relative engagement with the engagement hole 36 of the direction orthogonally intersecting the insert direction of the first and the second cover plates 16, 17 into the frame body 15. This second engagement guide portion 39 is formed as a slanting plane from the base end side toward the tip end side of the engagement protrusion 35. As shown in FIG. 14, a second removal preventing wall 40 is formed at the opposite side of the engagement protrusion not having the second engagement guide portion 39. The second removal preventing wall extends from the plane of the insert margins 18, 19. When the engagement protrusion 35 is engaged with the engagement hole 36, the second removal preventing wall 40 is brought into a relative abutment with an inner circumferential vertical surface of the engagement hole 36, thus preventing removal of the engagement protrusion 35 from the engagement hole 36.

Thus, the second engagement guide portion 39 and the second removal preventing wall 40 are provided on the plane of the engagement protrusion parallel to the insertion direction into the first and the second insert grooves 21, 22. This enables to push the first and the second frames 12 and 13 to approach each other when these frames 12 and 13 are deformed into direction to apart from each other. Accordingly, the second engagement guide portion 39 serves to guide the engagement protrusion 35 to be easily engaged with the engagement hole 36. After this relative engagement, the second removal preventing wall 40 is brought into abutment with the inner circumferential surface of the engagement hole 36, so as to prevent removal of the engagement protrusion 35 from the engagement hole 36.

Moreover, as shown in FIG. 10 and FIG. 11, an abutment piece 43 is provided at the base side of the first and the second cover plates 16 and 17. When the first and the second cover plates 16 and 17 are mounted on the frame body 15, the abutment piece 43 is brought into abutment with the back of the connection frame 14 of the frame body 15. As shown in FIG. 4 and FIG. 5, the abutment piece 43 has an engagement hole 46 to be relatively engaged with the engagement protrusion 45 provided on the back of the connection frame 14.

As shown in FIG. 5 and FIG. 6, the first and the second insert grooves 21 and 22 are constituted by a groove defining wall 47 whose insert margins 18 ad 19 are placed on a plane connected to stepped portions 48 and 49 which are formed on the upper and lower side ends of the connection frame 14 together with the flat wall 32 of the first and the second frames 12 and 13. When the first and the second cover plates 16 and 17 are inserted between the first and the second frames 12 and 13, the stepped portions 48 and 49 prevent generation of scars that may be caused when the cover plates 16 and 17 are brought into contact with the connection frame 14.

Moreover, as shown in FIG. 5, protrusion stripe 50 is formed in the center of and along the longitudinal direction of the connection frame 14. When the abutment pieces 43, 43 of the first and the second cover plates 16 and 17 are brought into abutment with the connection frame 14, the protrusion stripe 50 is sandwiched by these abutment pieces 43, 43, so that a clearance between the abutment pieces 43, 43 is less remarkable.

Figure 15:
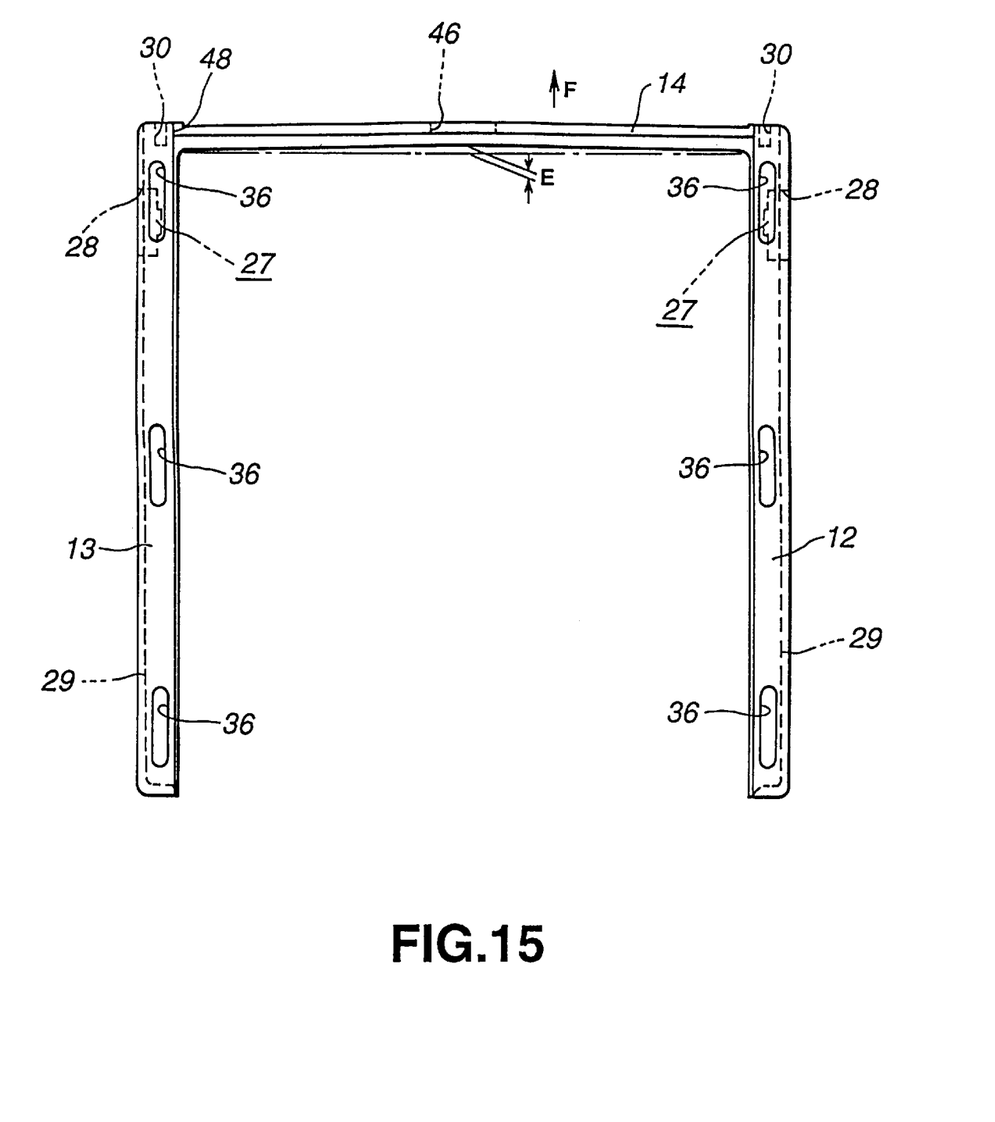
FIG. 15 is a plan view showing a frame body constituting the container case according to the present invention.

On the other hand, as shown in FIG. 15, the connection frame 14 of the frame body 15 has a curved shape slightly protruding outside at the center of the length. That is, the connection frame 14 is curved with a center portion protruding by an amount indicated by E in FIG. 15 than the position defined by the abutment pieces 43, 43 of the first and the second cover plates 16, 17 mounted and positioned between the first and the second frames 12 and 13. Because the connection frame 14 has such a curved shape, a force is given to urge the abutment pieces 43, 43 of the first and the second cover plates 16, 17 mounted and positioned between the first and the second frames 12, 13, into a direction opposite to the insert direction indicated by arrow F in FIG. 15.

As shown in FIG. 3, the first and the second cover plates 16 and 17 have cut-off indentations of an arc shape 51, 52. When the container case 11 is complete, these cut-off indentations 51, 52 constitute a grip portion where a back portion of the disc cartridge 1 contained in the container case 11 is exposed.

Next, explanation will be given on an assembling procedure of the container case 11 including the frame body 15, and the first and the second cover plates 16 and 17.

When assembling the container case 11, as shown in FIG. 3, the first insert guide portions 33 at the tip end of the insert margins 18 and 19 at the both sides of the first and the second cover plates 17 and 16 are respectively inserted into the open ends of the first and the second insert grooves 21 and 22 exposed at the base ends of the first and the second frames. Next, the first and the second cover plates 17 and 16 are pushed between the first and the second frames 12 and 13 and the insert margins 18 and 19 are inserted into the first and the second insert grooves 21 and 22.

The insert margins 18 and 19 have the first insert guide portions 33 at their one end and second insert guide portions 34 at the side and accordingly, it is possible to easily insert the insert margins 18 and 19 into the first and the second insert grooves 21 and 22 formed with a width almost identical to the thickness of the insert margins 18 and 19 so that the insert margins 18 and 19 are tightly engaged.

Figure 16:
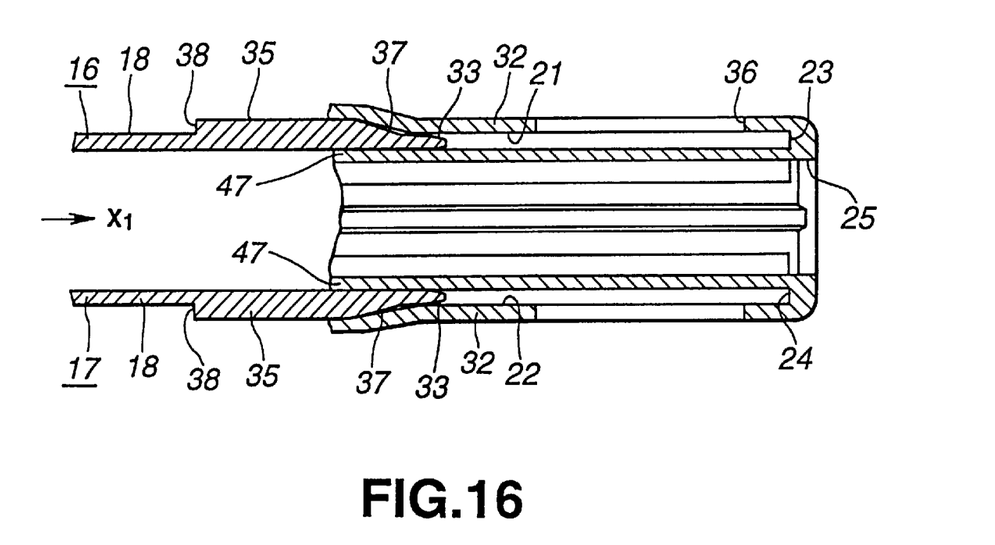
FIG. 16 is a partial cross sectional view showing the first and the second cover plates half inserted into the frame body.

When the insert margins 18 and 19 are inserted into the first and the second insert grooves 21 and 22, the engagement protrusion 35 pushes outside the first and the second insert grooves 21 and 22. As shown in FIG. 16, the first engagement guide portion 37 formed as a slanting plane provided at the tip end of the engagement protrusion 35 functions as a wedge to push out the insert grooves 21 and 22. Accordingly, the insert margins 18 and 19 can easily be inserted into the first and the second insert grooves 21 and 22.

Figure 17:
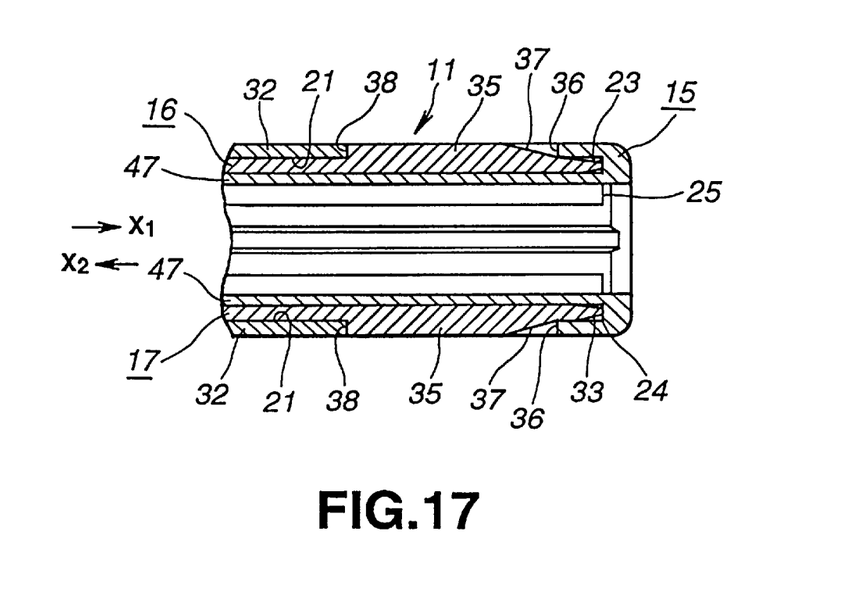
FIG. 17 is partial cross sectional view showing the first and the second cover plate inserted with a relative engagement between the engagement protrusion and the engagement hole.

After the insert margins 18 and 19 are inserted into the insert grooves 21 and 22, the first and the second cover plates 17 and 16 are further pushed in the direction indicated by arrow $X_1$ in FIG. 16 toward the tip ends of the first frames 12 and the second frames 13 until the first engagement guide portions 37 of the engagement protrusions 35 come out of the opening ends of the engagement holes 36. The insert margins 18, 19 are further inserted into the first and the second insert grooves 21 and 22 until the engagement protrusions 35 are guided by the first engagement guide portions 37 to be engaged with the corresponding engagement holes 36 as shown in FIG. 17. Here, the tip ends of the first and the second insert grooves are closed and accordingly, a further insert of the insert margins 18 and 19 in the direction of arrow $X_1$ is regulated. That is, the insert margins 18 and 19 are brought into abutment with the insert position regulators 23, 23.

Because the first and the second insert grooves 21 and 22 have tip ends closed by the insert position regulator 23, 24, the first and the second frames 12, 13 can have flat end faces as shown in FIG. 2, enabling to obtain a regular external view of the container case 11.

When the firs the second cover plates 17 and 16 are inserted into the frame body 15 until the engagement protrusions 35 are engaged with the corresponding engagement holes 36, the abutment piece 43 provided at the base end side is brought into abutment with the connection frame 14 having the outward protrusion, so as to push the connection frame 14 inward the frame body 15 in the direction indicated by arrow $X_1$, so as to make relative engagement between the abutment hole 46 provided in the abutment piece 43 and the engagement protrusion 45 provided in the connection piece 14.

When the first and the second cover plates 17 and 16 are inserted into the frame body 15, the connection frame 14 is pushed in the direction opposite to the protrusion direction, so as to urge the first and the second cover plates 17 and 16 in the direction of arrow $X_2$ in FIG. 17 opposite to the insert direction into the frame body 15. When the first and the second cover plates 17 and 16 are urged via the abutment piece 43 by the connection frame 14 in the direction $X_2$ in FIG. 18, the engagement protrusion 35 is also urged in the direction of arrow $X_2$ in FIG. 17, so as to bring the first removal preventing wall 38 formed at the base end side into a pressed abutment with the inner circumferential surface of the engagement hole 36, thus realizing a firm engagement with the engagement hole 36. Furthermore, the engagement hole 46 provided in the abutment piece 53 and the engagement protrusion 45 provided in the connection frame 14 are also urged to be engaged with each other. Thus, the first and the second cover plates 17 and 16 are accurately positioned with respect to the frame body 15 through the engagements at the opposing two sides and the base end side, so that the first and the second cover plates 17 and 16 are made into a unitary block with the frame body 15.

Figures 18, 19:
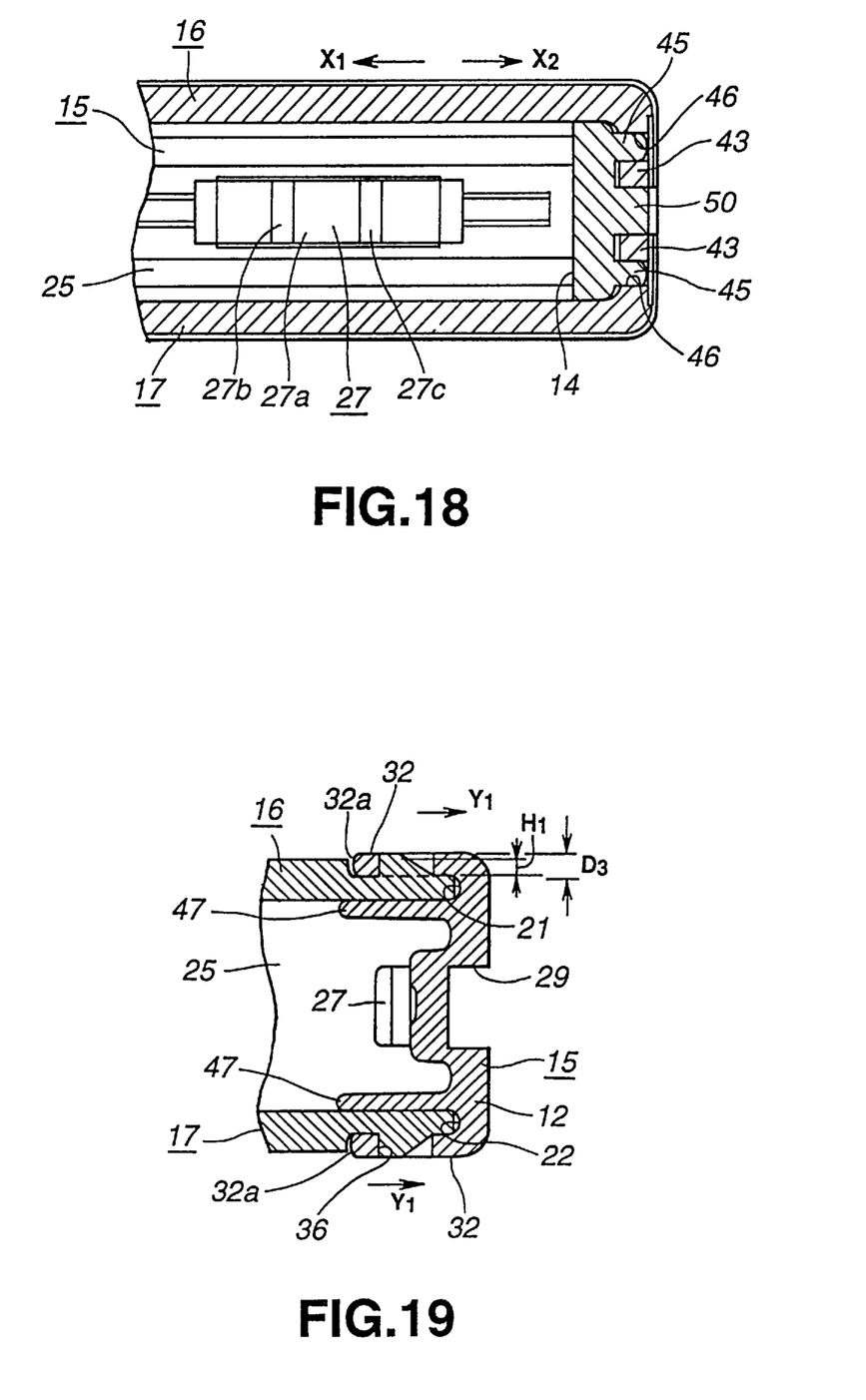
FIG. 18 is a vertical-longitudinal cross sectional view showing the container case having the first and the second cover plates mounted on the frame body.
FIG. 19 is a vertical-width direction cross sectional view showing the engagement protrusion engaged relatively with the engagement hole.

Moreover, when the engagement protrusion 35 is engaged with the engagement hole 36, as shown in FIG. 19, the second removal preventing wall 40 extending in a vertical direction from the plane of the insert margins 18 and 19 faces the inner vertical circumferential surface of the engagement hole 36. Accordingly, even if a Y1-direction (see FIG. 19) force is applied to the first frame 12 or the second frame 13, the second removal preventing wall 40 is brought into abutment with the inner vertical circumferential surface of the engagement hole 36, so as to prevent removal of the engagement protrusion 35 from the engagement hole 36. Thus, the first and the second cover plates 16, 17 are assured to be a part of the unitary block with the frame body 15.

Moreover, even if the first ad the second frames 12 and 13 are subjected to a force of $Y_1$ direction in FIG. 19 and the engagement protrusion 35 is removed from the engagement hole 36, by deforming the first and the second frames 12 and 13 to approach to each other, the engagement protrusion 35 can easily be engaged with the engagement hole 36 using as a guide the second engagement guide portion 39 formed as a slanting plane.

Furthermore, as shown in FIG. 19, the stepped portion 31 formed at both sides of the first and the second cover plate 16 and 17 so as to form the insert margins 18 and 19 has a height $H_1$ smaller than the thickness $D_3$ of the flat wall 32 constituting the first and the second grooves 21 and 22. Accordingly, when the first and the second covers 16 and 17 are mounted on the frame body 15 to constitute the container case 11, as shown in FIG. 2 and FIG. 9, the flat wall 32 can protrude at the both side of the first and the second cover plates 16 and 17. Because the both sides of the first and the second cover plates 16 and 17 protrude, when a plurality of container cases 11 are stacked vertically on a desk or the like, it is possible to prevent generation of scars on the surface of the first and the second cover plates.

Moreover, as shown in FIG. 8 and FIG. 19, the flat wall 32 has a tip end is provided with a curved chamfered portion 32a. Even if a clearance is present between the flat wall 32 and the stepped portion 31 of the insert margins 18 and 19, it is possible to prevent deformation due to a foreign matter sticking to the tip end of the flat wall 32, assuring the engagement between the engagement protrusion 35 and the engagement hole 36.

As has been described above, it is possible to form the container case 11 as shown in FIG. 2 only by inserting the first and the second cover plates 16 and 17 into the frame body 15. Thus, the container case 11 can easily be assembled. Furthermore, the first and the second cover plates 16 and 17 are urged to the frame body 15 when mounted on the frame body. Accordingly, it is possible to obtain the container case 11 in which the frame body 15 and the first and the second cover plates 16 and 17 are firmly formed into a unitary block.

Figure 20:
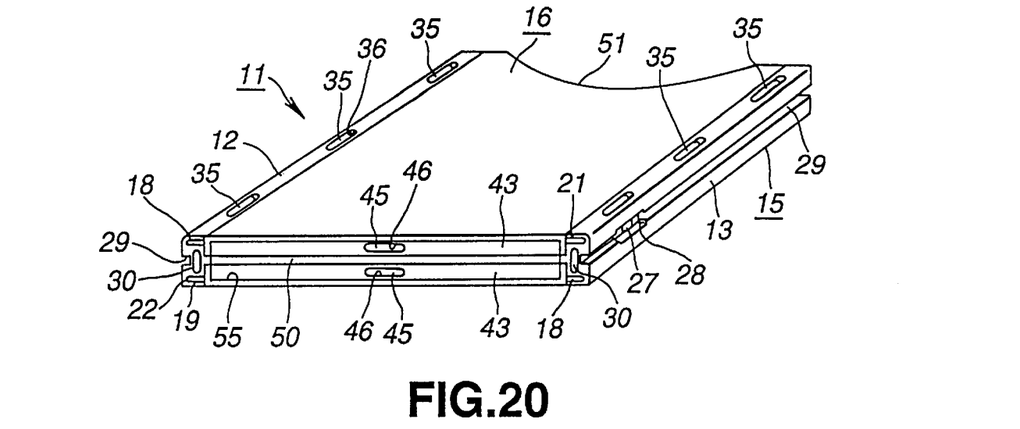
FIG. 20 is a perspective view showing a rear side of the container case according to the present invention.

As shown in FIG. 20, a label attachment section 55 is provided on the rear side of the container case 11 for attaching a label indicating the contents and type of the disc cartridge 1 contained in the container case 11. This label attachment section 55 is formed by an indentation at the back side of the engagement piece 43 of the first and the second cover plates 16 and 17. It is preferable that the label attachment section 55 has a depth corresponding to a thickness of a label to be attached here.

Figure 21:
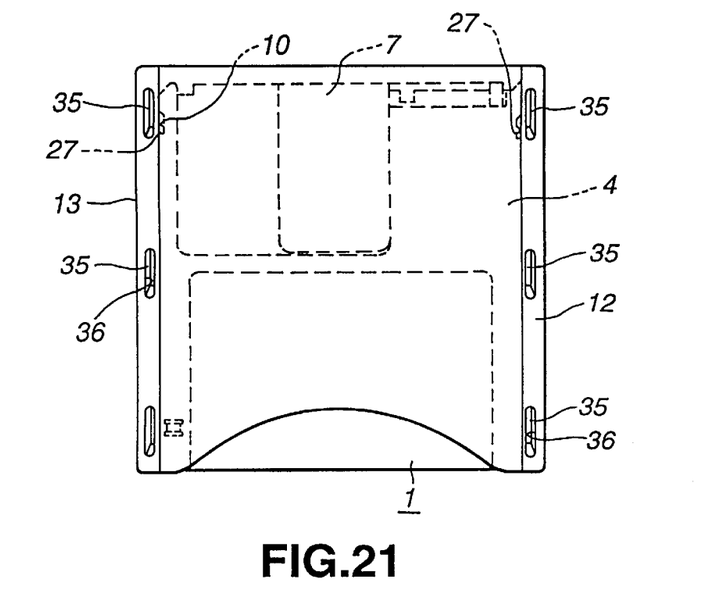
FIG. 21 is a plan view showing the container case according to the present invention containing a disc cartridge.

When placing the disc cartridge 1 into the container case 11 having the aforementioned configuration, the front side if the disc cartridge 1 having the shutter 7 is firstly inserted through an insert/removal opening 56 where the cut-off indentations 51 and 52 are formed. Here, the both sides of the disc cartridge I are engaged with the cartridge holding grooves 25 and 26 provided inside the frames 12 and 13. The disc cartridge 1 inserted into the container case 11 is guided by the cartridge holding grooves 25 and 26. When the disc cartridge 1 is completely contained in the container case 11 as shown in FIG. 21, the engagement indentations 10, 10 at both sides are relatively engaged with the cartridge holders 27, 27 provided in the container case 11. When the cartridge holders 27, 27 are engaged with the engagement indentations 10, 10, the disc cartridge will not fall from the container case 11.

The disc cartridge 1 contained in the container case 11 can be taken out of the container case 11 by holding the outwardly exposed portion via the cut-off indentations 51, 52. When the disc cartridge 1 is pulled out of the container case 11, the cartridge holder 27 is displaced outward of the first and the second frames 12 and 13 and disengaged from the engagement indentations 10, 10.

Figure 22:
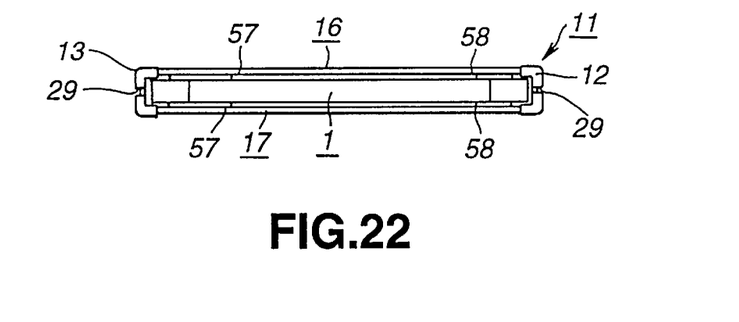
FIG. 22 is a front view showing the container case according to the present invention containing a disc cartridge and printed matters.

The container case 11 according to the present invention has a groove forming wall 47 formed between the first and the second insert grooves 21, 22 and the cartridge holding grooves 25, 26, so as to constitute these grooves 21, 22 and 25, 26. As shown in FIG. 22, a space corresponding to the thickness of the groove forming wall 47 is provided between the disc cartridge 1 whose both sides are held by the cartridge holding grooves 25, 26 and the inner surfaces of the first and the second cover plates 16, 17 whose insert margins 18 and 19 are engaged with the first and the second insert grooves 21, 22 so as to be mounted on the frame body 15. Accordingly, in the container case 11 according to the present invention, as shown in FIG. 22, a space defined between the first and the second cover plates 16, 17 and the disc cartridge 1 held by the cartridge holding grooves 25, 26 is used as printed matter storage sections 57, 57 for containing a printed matter 58 such as a leaflet where the contents of the optical disc 5 contained in the disc cartridge 11 are printed.

It should be noted that the printed matter storage section 57, 57 can have a thickness that can be adjusted by changing the groove forming wall 47 as is necessary.

The container case 11 according to the present invention has the frame body 15 having at its both ends the support piece engagement groove 29. Accordingly, when the container case 11 is put into a case stack apparatus for containing a plurality of cases in multiple steps, the support piece engagement groove 29 can be engaged with an engagement support body provided int he case stack apparatus, so that a plurality of the container cases 11 are placed regularly.

On the other hand, in the container case 11 according to the present invention, the frame body 15 constituting the outer wall of the container case 11 is formed independently from the first and the second cover plates 16 and 17 facing the plane of the disc cartridge 1 contained in this container case 11. Accordingly it is possible to use materials most appropriate for the functions of the frame body 15 and the first and the second cover plates 16 and 17, respectively.

In the container case 11 according to the present invention, the frame body 15 is made from a synthetic resin having a greater shock resistance than that of the first and the second cover plates 16 and 17. As the synthetic resin having an excellent shock resistance, there can be exemplified acrylonitrile butadiene styrene (ABS) resin, polypropylene (PP) resin, and polyacetal (POC) resin.

As for the first and the second cover plates 16 and 17, a light-transmitting synthetic resin is used so that the disc cartridge 1 contained in the container case 11 can be viewed from outside. For example, it is possible to use polystyrene (PS) resin, acrylonitrile styrene (AS) resin, or polycarbonate (PC).

It should be noted that in order to see the interior of the container case 11, only one of the first and the second cover plates 16 and 17 needs to be made from a light-transmitting synthetic resin.

The container case 11 according to the present invention is assembled from independently formed components: the frame body 15 constituting the outer wall and the first and the second cover plate 16 and 17 mounted so as to be surrounded by the frame body 15. Accordingly, the container case 11 can have a sufficient mechanical strength as the container case 11, while enabling to obtain a wide selection of the materials constituting the first and the second cover plates 16 and 17 constituting the main surfaces of the container case 11. This enables to easily form a preferable configuration as the container case 11 of the disc cartridge 1.

The container case 11 has the engagement protrusion 35 on the cover plates 16 and 17 whereas the engagement hole 36 is provided in the frame body 15. However, this can be reversed. Furthermore, it is possible that the engagement protrusion 35 is provided at the side ed of the insert margins 18 and 19, and the engagement hole 36 is provided at the side surface of the frames 12 and 13.

Moreover, in the container case 11, the first and the second cover plates 16 and 17 have the abutment piece 43 to be brought into abutment with the connection frame 14 of the frame body 15, so that three sides of the rectangular cover plates 16 and 17 are supported by the frame body 15. However, it is also possible to fix only the opposing two sides having the insert margins 18 and 19.

As has been described above, the container case according to the present invention includes a frame body consisting of a first frame and a second frame connected by a connection frame, and a first cover plate and a second cover plate which are inserted between the thirst and the second frames. Accordingly, it is possible to select materials most appropriate for the frame body, the first cover plate, and the second cover plate, respectively. Here, the frame body can be formed from a synthetic resin having a greater shock resistance than that of the first and the second cover plates, and at least one of the first and the second cover plates can be formed from a light-transmitting synthetic resin. Thus, it is possible to produce a container case appropriate for containing a disc cartridge at a reasonable cost.

Moreover, the first and the second cover plates are mounted on the frame body with their insert margins inserted into first and second insert grooves formed on the opposing faces of the first and the second frames, and engagement means provided between the insert margins and the first and second frames are relatively engaged, facilitating the assembly procedure.

Furthermore, the first and the second cover plates have at their base ends an abutment piece which is brought into abutment with the connection frame of the frame body when the first and the second cover plates are inserted between the first and the second frames. Moreover, there is provided engagement means consisting of an engagement protrusion and an engagement hole that are relatively engaged when the first and the second cover plates are inserted between the first and the second frames. Thus, the first and the second cover plates can be firmly fixed to the frame body.

What is claimed is:

1. A disc cartridge container case comprising:
   a frame body constituted into a unitary block by a first frame and a second frame opposing to each other and a connection frame connecting base ends of said first frame and said second frame;
   a first cover plate and a second cover plate to be inserted between said first and said second frames;
   two pairs of a first insert groove and a second insert groove, each formed on opposing surfaces of said first and second frames, extending in a longitudinal direction parallel to each other, and having one open end at said base end and an insert regulator at a tip end of said first and said second frames;
   engagement means consisting of an engagement protrusion and an engagement hole for relative engagement provided between said first and second frames and said insert margins formed at opposing two sides of said first and said second cover plates to be inserted into and engaged with said first and said second insert grooves; and;
   a cartridge holder provided on opposing surfaces of said first and said second frames,
   wherein said first and said second cover plates are mounted between said first and said second frames by inserting said insert margins at both sides into said first and said second insert grooves from an insert end until said engagement means provided between said insert margins and said first and said second frames makes a relative engagement.

2. A disc cartridge container case as claimed in claim 1, wherein said first and said second cover plates have at their base ends: an abutment piece to be brought into abutment with said connection frame when said first and said second cover plates are inserted between said first and said second frames; and engagement means consisting of an engagement protrusion and an engagement hole for relative engagement between said abutment piece and said connection piece.

3. A disc cartridge container case as claimed in claim 2, wherein said connection frame of said frame body is formed with an urging force for urging said first and said second cover plates mounted on said frame body with relative engagement through said engagement means provided between said insert margins and said first and said second frames, into a direction opposite to the insert direction into said frame body.

4. A disc cartridge container case as claimed in claim 1, said case comprising a plurality of said engagement means provided between said insert margins and said first and said second frames and arranged in the insert direction of said first and said second cover plates into said first and said second frames.

5. A disc cartridge container case as claimed in claim 1, wherein
   said engagement protrusion constituting said engagement means provided between said insert margins and said first and said second frames is provided on said insert margins;
   a first guide portion for guiding into said engagement hole is formed at the insert tip end of said first and said second cover plates; and
   a first removal preventing wall is formed at the base end opposing to the insert direction of said first and said second cover plates.

6. A disc cartridge container case as claimed in claim 3, wherein said engagement protrusion provided on said insert margins is provided on a surface parallel to an outside surface of said first and said second cover plates; and said engagement hole to be engaged with said engagement protrusion is provided on an outside flat wall; and
   wherein a second engagement guide portion is provided for guiding a relative engagement between said engagement protrusion with said engagement hole in a direction orthogonally intersecting the insert direction of said first and said second cover plates into said frame body; and a second removal preventing wall is formed at a side opposing to the side where said second engagement guide portion is formed.

7. A disc cartridge container case as claimed in claim 1, wherein said insert margin has a stepped portion so as to have a thickness smaller than a thickness of said first and said second cover plates.

8. A disc cartridge container case as claimed in claim 1, wherein said connection frame of said frame body has at its opposing ends, a stepped portion formed to have a thickness almost identical to that of said first and said second cover plates to be inserted between said first and said second frames.

9. A disc cartridge container case as claimed in claim 1, wherein cartridge holding grooves are provided in the longitudinal direction of said first and said second frames for holding opposing two sides of a disc cartridge to be contained in said container case; and said cartridge holder is provided in said cartridge grooves.

10. A disc cartridge container case as claimed in claim 1, further including a disc cartridge contained with its both sides held in said cartridge holding grooves, a printed matter containing space is defined between said disc cartridge and at least one of said first and said second cover plates.

11. A disc cartridge container case as claimed in claim 1, wherein a support means insert groove is formed at the outer sides of said first and said second frames for enabling engagement with support means provided in a storage apparatus.

12. A disc cartridge container case as claimed in claim 11, wherein said cartridge holder is formed by forming on the side wall of said first and said second frames a protruding portion in an opposing direction, so that an indentation formed at the opposite side of the protruding portion is used as an engagement portion of the engagement holder provided in a storage apparatus.

13. A disc cartridge container case as claimed in claim 1, wherein said frame body is formed from a synthetic resin having a greater shock resistance than that of said first and said second cover plates.

14. A disc cartridge container case as claimed in claim 13, wherein at least one said first and said second cover plates is formed from a light-transmitting synthetic resin.

15. A disc cartridge container case as claimed in claim 1, wherein a label attachment section is provided on an outer surface of said connection frame of said frame body.

* * * * *